(12) United States Patent
Miura et al.

(10) Patent No.: US 6,278,910 B1
(45) Date of Patent: Aug. 21, 2001

(54) COMPRESSOR DRIVING APPARATUS

(75) Inventors: Kenichiro Miura, Otsu; Keizo Matsui, Kusatsu; Yoshihiro Tokorotani, Yawata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/107,346

(22) Filed: Jun. 30, 1998

(30) Foreign Application Priority Data

Jun. 30, 1997  (JP) .................................................... 9-173430

(51) Int. Cl.[7] ...................................................... H02K 9/00
(52) U.S. Cl. ............................. 700/297; 62/158; 318/803
(58) Field of Search ............................... 700/297; 62/158; 318/803

(56) References Cited

U.S. PATENT DOCUMENTS

| | | | |
|---|---|---|---|
| 4,736,595 | * | 4/1988 | Kato ........................................ 62/160 |
| 4,989,414 | * | 2/1991 | Murayama et al. ................. 62/228.4 |
| 5,177,972 | * | 1/1993 | Sillato et al. ........................... 62/205 |
| 5,179,842 | * | 1/1993 | Kanazawa ............................... 62/158 |
| 5,259,211 | * | 11/1993 | Ikeda .................................... 62/228.4 |
| 5,299,432 | * | 4/1994 | Nakae et al. ............................ 62/298 |
| 5,300,872 | * | 4/1994 | Endo et al. ............................ 318/802 |
| 5,371,645 | * | 12/1994 | Mochizuki ............................. 361/22 |
| 5,410,890 | * | 5/1995 | Arima .................................. 62/228.4 |
| 5,493,155 | * | 2/1996 | Okamoto et al. ....................... 307/45 |
| 5,526,650 | * | 6/1996 | Iritani et al. ............................ 62/205 |
| 5,604,672 | * | 2/1997 | Yoshida et al. ......................... 363/97 |
| 5,646,499 | * | 7/1997 | Doyama et al. ...................... 318/801 |
| 5,663,627 | * | 9/1997 | Ogawa .................................. 318/803 |
| 5,701,753 | * | 12/1997 | Iritani .................................... 62/211 |
| 5,764,022 | * | 6/1998 | Kazama et al. ...................... 318/801 |
| 5,793,623 | * | 8/1998 | Kawashima et al. .................. 363/56 |
| 5,934,094 | * | 8/1999 | Itoh et al. ............................... 62/222 |
| 6,003,325 | * | 12/1999 | Kurahashi et al. ..................... 62/212 |
| 6,024,547 | * | 2/2000 | Nagae ..................................... 418/11 |
| 6,035,653 | * | 3/2000 | Itoh et al. ............................ 62/228.4 |
| 6,065,298 | * | 5/2000 | Fujimoto ................................ 62/230 |

* cited by examiner

*Primary Examiner*—Thomas Lee
*Assistant Examiner*—Nguyễn Nguyên
(74) *Attorney, Agent, or Firm*—Ratner & Prestia

(57) ABSTRACT

A compressor driving apparatus comprises a module including a power supply, an inverter for driving a compressor, an inverter driver for driving the inverter, a CPU for generating a signal to be used for driving the inverter and having a function for communicating with outside, a storage circuit for storing data which is alterable from an external device, and a relay driver for driving an external relay. The inverter and other circuit components are disposed within the module such that they are thermally separate such that an inverter driving signal from the CPU is transferred accurately to the inverter and that a power supply having an output voltage with low distortion is realized, thereby improving the operating efficiency of the compressor. Because the storage circuit and the power supply circuit are built-in, standardization of the compressor driving apparatus is easily realized.

20 Claims, 3 Drawing Sheets

COMPRESSOR DRIVING APPARATUS

FIELD OF THE INVENTION

The present invention relates to a compressor driving control technique for use in air conditioners, and other devices.

BACKGROUND OF THE INVENTION

In recent years, air conditioners equipped with an inverter have become wide spread, and reduction in size, performance improvement, reduction in cost and improved reliability are desired.

FIG. 1 is a block diagram showing a conventional compressor driving apparatus. In FIG. 1, inverter circuit 1 and inverter driving circuit 2 are housed in module unit 3. A low voltage direct current supply circuit 5 is adapted to convert a high voltage direct current from high voltage direct current power supply ("HV-DC power supply") 4 into a low voltage direct current for use in the inverter driving circuit 2. A driving signal generating circuit 6 for inverter circuit 1 is connected to the inverter driving circuit 2 through an insulating circuit 7. Circuits 4 through 7 are disposed outside of the module unit 3. Compressor 8 is a load against the inverter circuit 1.

In the prior art, the insulating circuit 7, which comprises photocouplers, etc., is required because an isolation is necessary between the driving signal generating circuit 6 and the module unit 3 from the standpoint of safety. There is a problem, however, that waveforms of an output voltage from the inverter circuit 1 are distorted. This is because a signal developed by the driving signal generating circuit 6 is of relatively high speed, such that a time lag occurs under the influence of the insulating circuit 7.

Moreover, it is required to prepare in advance the data for the driving signal generating circuit 6 for each and every specification of the compressor 8. As a result, it is difficult to standardize a compressor driving section including the driving signal generating circuit 6, the inverter driving circuit 2 and the inverter circuit 1.

In the control system of inverter type air conditioners of the prior art, a compressor driving signal generating section and the compressor driving section for driving the compressor are arranged separately. This results in drawbacks, such as low operating efficiency due to inaccurate operation of a compressor driving power supply (distortion of supply voltage wave forms) and lack of standardization.

An object of the present invention is to resolve the above cited problems of the prior art, and to provide a compressor driving apparatus for air conditioners that results in a smaller size, higher performance and standardization.

SUMMARY OF THE INVENTION

A compressor driving apparatus of this invention comprises a module unit that houses:
- a power supply for converting an externally supplied high voltage direct current into a low voltage direct current;
- an inverter for converting the high voltage direct current into an alternating current for driving a compressor;
- an inverter driver for driving the inverter;
- a central processing unit ("CPU") for generating a signal to be used for driving the inverter, and having a function for communicating with the external devices;
- a storage circuit for storing data which is alterable from the outside; and,
- a relay driver for driving an external relay,
- and that a portion of the output from the power supply is available for supplying external devices. This may improve the operational efficiency of the compressor because the inverter driving signal generated by the CPU is accurately transferred to the inverter, which enables the supply of low distortion electricity to the compressor. In addition, standardization, as well as a reduction in size, becomes possible since the data representative of each type of compressor is stored in the storage circuit. This data may be freely reconfigured using an external device.

In the present invention, the inverter circuit is covered by polymeric resin after the circuit is disposed on a metallic member. The other circuits are mounted on a printed circuit board and are disposed apart from the inverter circuit. The inverter circuit and other circuits are then integrally molded using a polymeric resin. Therefore, reliability is increased because heat generating members and non-heat generating members are separated from one another.

Also, the present invention is adapted to provide a relay driving signal when a predetermined time has elapsed after voltage of the high voltage direct current power supply ("HV-DC power supply") exceeds a predetermined value. The predetermined time may be varied via a communication port, so that it is adaptable to any HV-DC power supply.

Furthermore, the present invention comprises a capacitor for grounding a negative side terminal of the HV-DC power supply. The capacitor may suppress an excessive leakage current in high frequency band.

DESCRIPTION OF TIE PREFERRED EMBODIMENTS

Figure 1:
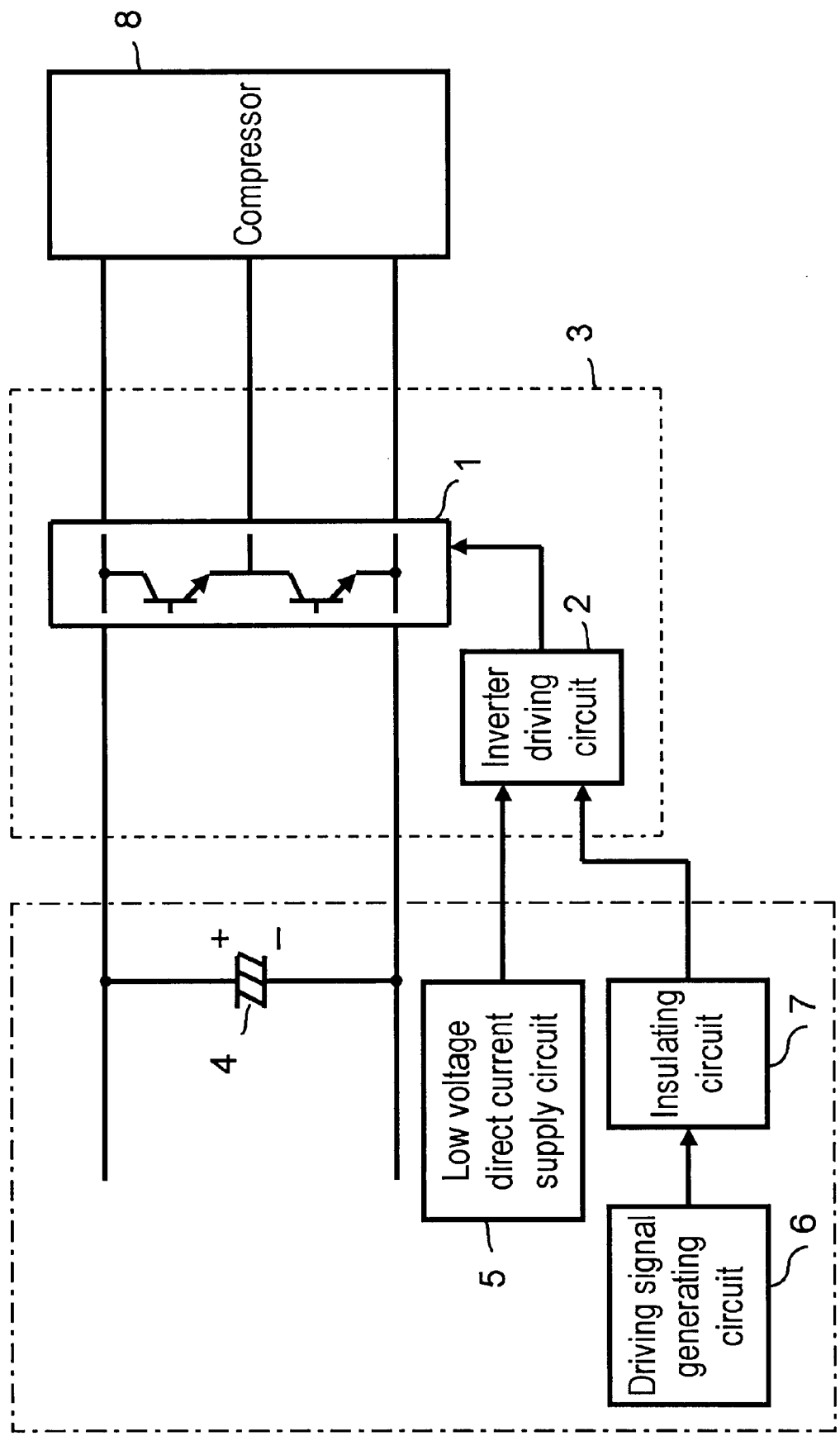
FIG. 1 is a block diagram of a compressor driving apparatus of the prior art.
Figure 2:
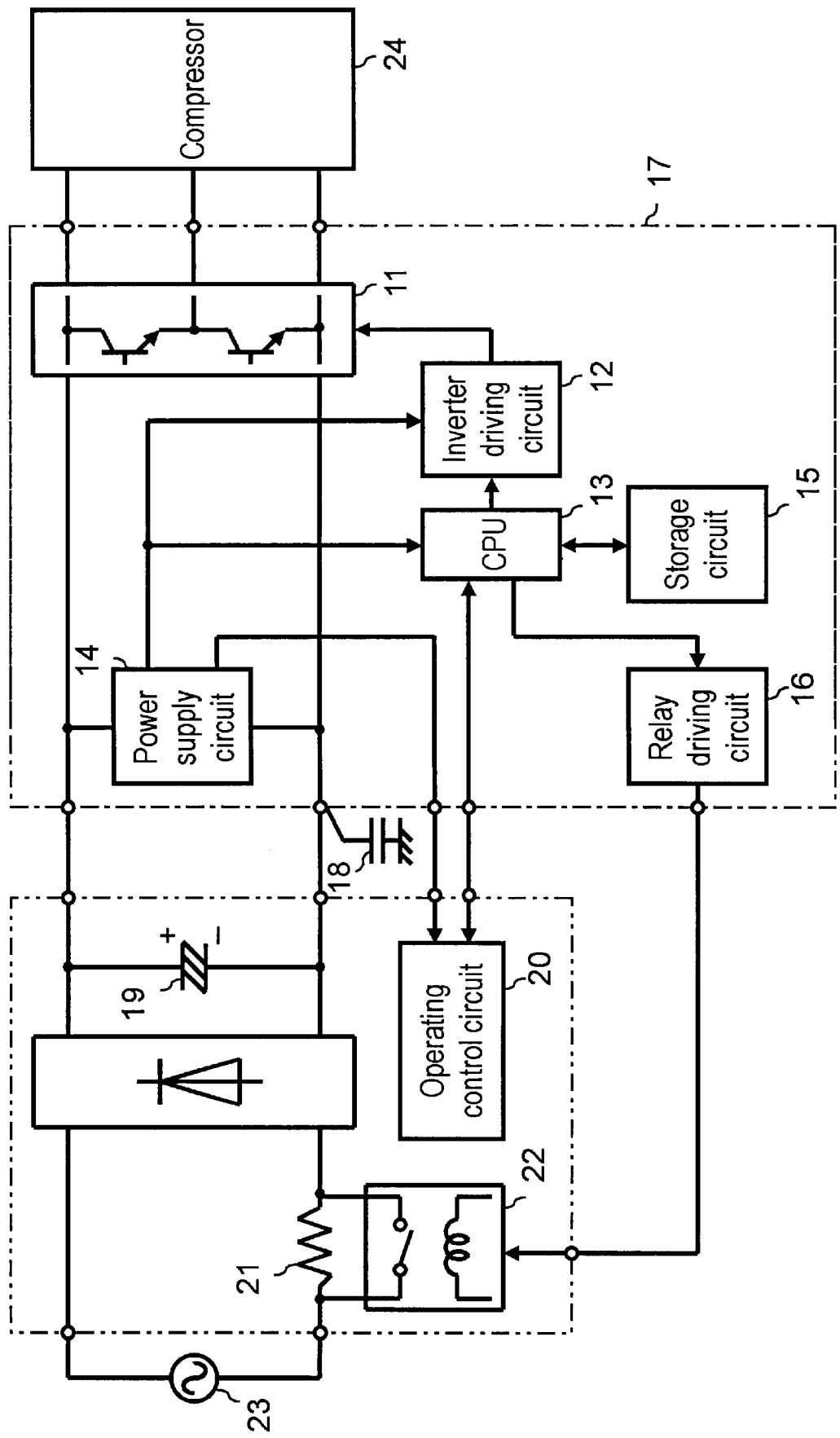
FIG. 2 is a block diagram of a compressor driving apparatus of a preferred embodiment of the present invention.

FIG. 2 is a block diagram of a compressor driving apparatus of an exemplary embodiment of the present invention. The compressor driving apparatus of the present embodiment comprises an inverter 11, an inverter driver 12, a central processing unit ("CPU") 13, a power supply 14, a storage circuit 15, a relay driver 16, a capacitor 18, a high voltage direct current power supply ("HV-DC power supply") 19, an operating control circuit 20, a resistor 21 for suppressing inrush current and a relay 22.

Module unit 17 houses the inverter 11, the inverter driver 12, the CPU 13, the power supply circuit 14, the storage circuit 15 and the relay driver 16. The other circuits are arranged external to the module unit 17. FIG. 2 also shows a compressor 24, which is driven by a commercial power source 23 and the inverter 11. The capacitor 18 is connected between a negative side terminal of the HV-DC power supply 19 at the module unit 17 and the earth ground.

Power from the commercial power source 23 is supplied to the HV-DC power supply 19 through resistor 21 which suppresses inrush current. The HV-DC power supply 19 generates a high voltage direct current for driving the power supply 14 and inverter 11.

The power supply 14 converts the high voltage direct current from the HV-DC power supply 19 into a low voltage direct current. This low voltage direct current output is supplied to the inverter driver 12 and the CPU 13 within the module unit 17. In addition, a portion of the output is also supplied to the is operating control circuit 20 located external to the module unit 17.

Relay 22 is used to suppress the inrush current that is induced when the commercial power source 23 is switched on. That is, when a voltage of the HV-DC power supply 19 reaches a predetermined value after the commercial power source 23 is switched on, the CPU 13, after a predetermined time delay, activates relay 22 via the relay driver 16 in order to short-circuit the resistor 21. As a result, the suppression of inrush current is terminated.

The inverter 11 converts the high voltage direct current of the HV-DC power supply 19 into an alternating current, and delivers the alternative current to compressor 24. The CPU 13 generates an inverter driving signal according to the data stored in the storage circuit 15 together with a control signal from the operating control circuit 20, and outputs the signal to the inverter driver 12. The CPU 13 also generates a relay driving signal and outputs the signal to the relay driver 16. Since the apparatus does not require an insulating circuit composed of a photo coupler, etc., between the CPU 13 and the inverter driver 12, as shown in FIG. 2, the inverter driving signal generated by the CPU 13 is transferred directly to the inverter driver 12 without passing through an insulating circuitry, thereby reducing distortion of the output voltage.

An operation is executed by the signal, e.g. a signal instructing an operating frequency, etc. output by the operating control circuit 20. The operating control circuit 20 is located external to the module unit 17 and the CPU 13, housed within module unit 17, has a function for communicating data between them. Since the transmission speed between the CPU 13 and operating control circuit 20 is relatively slow, there is no impediment to the operation, even if some time lag occurs as a result of insulating circuitry provided between the operating control circuit 20 and the CPU 13. Thereby providing an increased measure of safety.

Also, standardization may be promoted by accommodating many types of compressor through the use of storage circuit 15 (e.g., an electrically erasable and programmable read-only memory "EEPROM") having reprogrammable data (carrier frequency, voltage data, frequency variation speed, etc.). The storage circuit 15 may be reprogrammed as desired from an external source via CPU 13.

Furthermore, data may be easily written due to the power supply 14, which converts a high voltage direct current into a low voltage direct current. Furthermore, the overall size of the apparatus is reduced because a portion of the electricity is provided external devices. A method for externally supplying an output of the power supply 14 may be of either an insulated type or an uninsulated type. The safety is improved by isolating the operating control circuit 20 if the insulated type is chosen. The size of the power supply 14 may be reduced if the uninsulated type is chosen.

Figure 3:
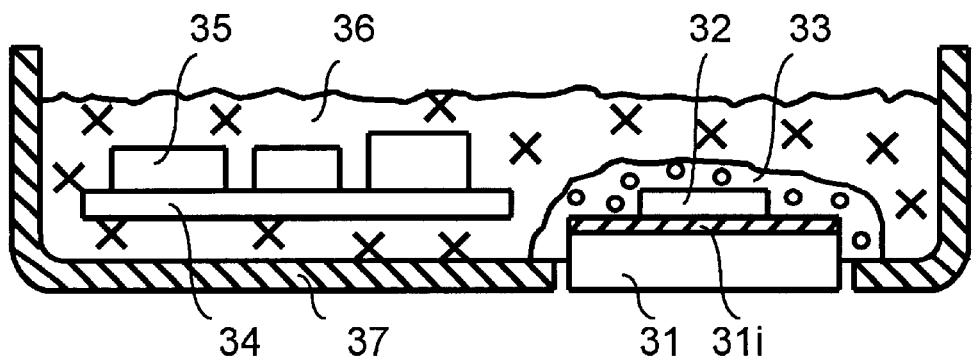
FIG. 3 is a cross-sectional view of a module unit of a compressor driving apparatus of the embodiment of the present invention.

FIG. 3 is a cross-sectional view showing an internal structure of the module unit of the compressor driving apparatus of an exemplary embodiment of the present invention. Semiconductor components that compose the inverter 11, along with a group of power semiconductors 32, such as insulated gate bipolar transistors ("IGBT"), ordinary transistors and diodes are closely attached on a surface of a metallic member 31. The surface of metallic member 31 is treated with an insulating layer 31*i* so as to reduce a heat resistance therebetween, and the components are covered by first polymeric resin 33. The metallic member 31 also acts as a heatsink. On the other hand, other circuit components 35 that are comparatively susceptible to high temperature are mounted on a printed circuit board 34. Accordingly, the other circuit components 35 are disposed apart from the inverter 11 and the power semiconductors 32. The circuit components 35, inverter 11 and power semiconductors 32 are then covered by second polymeric resin 36, and a third polymeric resin 37 integrates the above elements into one mold.

The structure as shown in FIG. 3 improves reliability, because it adequately dissipates heat from heat generating members of the power semiconductors 32 through the metallic member 31, and thermally isolates the other circuit components 35 that are comparatively susceptible to high temperature.

Figure 4:
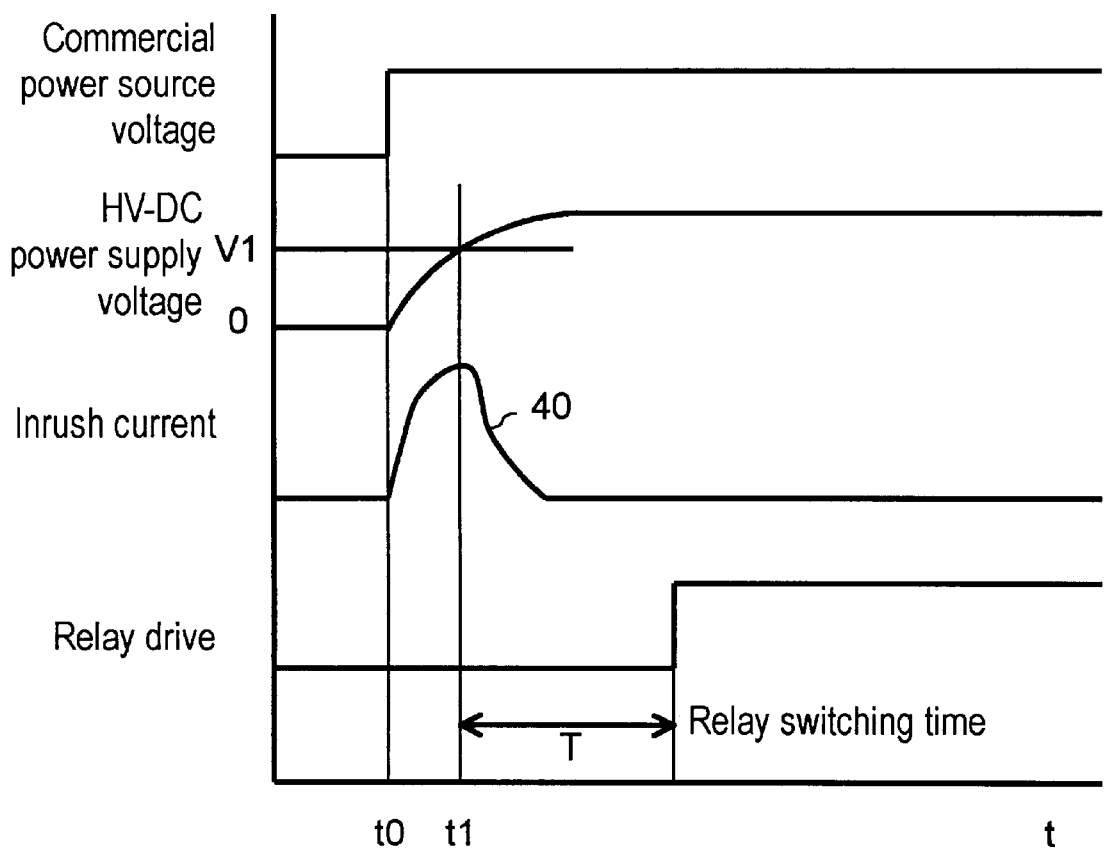
FIG. 4 is a graphic chart depicting a switching time of a relay for suppressing an inrush current in the preferred embodiment of the present invention.

Control of the relay 22, which suppresses inrush currents induced by the activation of the commercial power source 23, is shown in FIG. 4. The inrush current 40 starts to flow when the voltage of the HV-DC power supply 19 increases after the commercial power source 23 is switched on at time t0. The inrush current 40 then decreases after having reached at its peak point. The CPU 13 activates relay 22 through the relay driver 16 after a predetermined time delay T (hereinafter called "relay switching time") from time t1 when the voltage of the HV-DC power supply 19 has reached a predetermined value V1 at the time t1. The relay switching time T is selected so as to activate the relay 22 after the inrush current 40 becomes near zero, thereby enabling a to substantial stress reduction on the contact points of relay 22. Moreover, since a length of the relay switching time T is designed to be reprogrammable into the storage circuit 15 externally through the CPU 13, it is adaptable to any type of HV-DC power supply.

Because the negative side terminal of the module unit 17 for the HV-DC power supply is at a potential nearly equivalent to earth ground in the high frequency band, due to the capacitor 18, an excessive leakage current especially of the high frequency component from the compressor, generated by operation of the inverter 11 may be suppressed.

As described above, the apparatus of the present invention, having a comparatively simple structure, is able to accurately transfer the inverter drive signal output by the CPU to the inverter circuit, such that it has an effect for improving the operating efficiency of the compressor because of a small distortion in the output voltage.

The apparatus of the present invention also easily realizes standardization since it has a storage circuit and a power supply circuit built-in.

The apparatus of the present invention also realizes a highly reliable system since heat generating members and non-heat generating members are thermally separated from one another.

The apparatus of the present invention is also adaptable to any type of HV-DC power supply because it contains a relay driver, where the relay switching time T is externally settable.

The apparatus of the present invention is also able to suppress an excessive leakage current generated by the compressor and other components because of the capacitor connected to the negative side terminal of the module unit for the HV-DC power supply.

What is claimed is:

1. An apparatus for driving a compressor for use with an external power source, said apparatus comprising:
   a high voltage direct current power supply for generating high voltage direct current power;
   a metallic member, said metallic member being treated with an insulator; and
   a module unit housing therein:
   a second power supply coupled to said high voltage direct current power supply for converting said high voltage direct current power into low voltage direct current power;
   an inverter for converting said high voltage direct current power into alternating current power for driving said compressor;
   an inverter driver coupled to said second power supply for driving said inverter;
   a CPU coupled to said second power supply and said inverter driver, said CPU generating a signal for driving said inverter;
   wherein said inverter is disposed on said metallic member and covered by a first polymeric resin, all other circuits being mounted on a printed circuit board except for said inverter, said printed circuit board being disposed separately from said inverter, and all of said circuits and said inverter are formed as an integrally molded structure using a second polymeric resin.

2. The apparatus of claim 1, wherein at least a portion of an output of said second power supply is provided external to said module unit.

3. The apparatus of claim 2, wherein the output of said second power supply is insulated from said high voltage direct current power supply.

4. The apparatus of claim 2, wherein the output of said second power supply is uninsulated from said high voltage direct current power supply.

5. The apparatus of claim 1, wherein said CPU and said inverter driver are directly connected to one another.

6. The apparatus of claim 1, further comprising a resistor coupled between said external power source and said high voltage direct current power supply, said resistor suppressing an inrush current from said high voltage direct current power supply, wherein a relay driving signal is controlled so as to short-circuit said resistor when a predetermined time elapses after a voltage of said high voltage direct current power supply exceeds a predetermined value.

7. The apparatus of claim 6, wherein said predetermined time is variable.

8. The apparatus of claim 1, further comprising a capacitor coupled between a negative side terminal of said high voltage direct current power supply and ground.

9. The apparatus of claim 1, wherein said CPU communicates with an external device.

10. The apparatus of claim 9, wherein said data is configurable using said external device.

11. The apparatus of claim 1, wherein said module unit further comprises a storage circuit coupled to said CPU for storing data.

12. The apparatus of claim 11, wherein said storage circuit comprises an EEPROM, and storage of data therein is controlled by said CPU.

13. The apparatus of claim 1, further comprising:
    a relay coupled to said external power source; and
    a relay driver contained within said module unit and coupled to said CPU for driving said relay.

14. An apparatus for driving a compressor for use with an external power source, said apparatus comprising a module unit including:
    a high voltage direct current power supply for generating high voltage direct current power;
    a second power supply coupled to said high voltage direct current power supply for converting said high voltage direct current power into low voltage direct current power;
    an inverter for converting said high voltage direct current power into alternating current power for driving said compressor;
    an inverter driver coupled to said second power supply for driving said inverter;
    an additional circuit, and
    a metallic member treated with an insulator;
    wherein said inverter is disposed on said metallic member and covered by a first polymeric resin, said additional circuit being mounted on a printed circuit board, said printed circuit board being disposed separately from said inverter, and all of said circuits and said inverter are formed as an integrally molded structure using a second polymeric resin.

15. The apparatus of claim 14, said another circuit comprising:
    a CPU coupled to said second power supply and said inverter driver, said CPU generating a signal for driving said inverter and communicating with an external device outside said module unit;
    a storage circuit coupled to said CPU for storing data, said data being configurable from outside said module unit; and
    a relay driver for driving a relay disposed outside said module unit.

16. The apparatus of claim 14, wherein at least a portion of an output of said second power supply is provided external to said module unit.

17. The apparatus of claim 14, wherein the output of said second power supply is insulated from said high voltage direct current power supply.

18. The apparatus of claim 14, wherein the output of said second power supply is uninsulated from said high voltage direct current power supply.

19. The apparatus of claim 14, wherein said CPU and said inverter driver are directly connected to one another.

20. An apparatus for driving a compressor for use with an external power source, said apparatus comprising a module unit, said module unit comprising:
    a power supply for converting a high voltage direct current power externally supplied into low voltage direct current power;
    an inverter for converting said high voltage direct current power into alternating current power for driving said compressor;
    an inverter driver coupled to said power supply for driving said inverter;
    an additional circuit; and
    a metallic member treated with an insulator;
    wherein said inverter is disposed on said metallic member and said additional circuit being thermally separated from said inverter.

* * * * *